United States Patent
Morovic et al.

(10) Patent No.: US 10,434,716 B2
(45) Date of Patent: Oct. 8, 2019

(54) THREE-DIMENSIONAL OBJECT SUBSTRUCTURES

(71) Applicant: Hewlett-Packard Development Company, L.P., Houston, TX (US)

(72) Inventors: Peter Morovic, Sant Cugat del Valles (ES); Jan Morovic, Colchester (GB); Alejandro Manuel De Pena, Sant Cugat del Valles (ES); Juan Manuel Garcia Reyero Vinas, Sant Cugat (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/547,443

(22) PCT Filed: Apr. 24, 2015

(86) PCT No.: PCT/EP2015/058916
§ 371 (c)(1),
(2) Date: Jul. 28, 2017

(87) PCT Pub. No.: WO2016/119908
PCT Pub. Date: Aug. 4, 2016

(65) Prior Publication Data
US 2018/0009168 A1    Jan. 11, 2018

(30) Foreign Application Priority Data

Jan. 30, 2015 (WO) ............... PCT/US2015/013841

(51) Int. Cl.
*B29C 64/386* (2017.01)
*H04N 1/405* (2006.01)
(Continued)

(52) U.S. Cl.
CPC .......... *B29C 64/386* (2017.08); *B29C 64/393* (2017.08); *B33Y 50/00* (2014.12);
(Continued)

(58) Field of Classification Search
None
See application file for complete search history.

(56) References Cited

U.S. PATENT DOCUMENTS

| 6,936,212 | B1 | 8/2005 | Crawford |
| 2002/0024687 | A1* | 2/2002 | Allen .................. B41J 2/52 358/534 |

(Continued)

FOREIGN PATENT DOCUMENTS

WO    WO 2013/163398    10/2013

OTHER PUBLICATIONS

Cho, Wonjoon, et al., "A Dithering Algorithm for Local Composition Control with Three-Dimensional Printing" Massachusetts Institute of Technology, 2002, 26 pages.
(Continued)

*Primary Examiner* — Ryan A Jarrett
(74) *Attorney, Agent, or Firm* — HP Inc. Patent Department

(57) ABSTRACT

Methods and apparatus relating to substructures for three-dimensional objects are described. In an example, a method comprises receiving a lattice model having a consistent dimensionality and determining a substructure model representing a three-dimensional material structure, the substructure model being based on the lattice model and specifying a variable material distribution. The substructure model may be populated with halftone threshold data to provide a three-dimensional halftone threshold matrix.

6 Claims, 4 Drawing Sheets

(51) Int. Cl.
- *B33Y 50/02* (2015.01)
- *B29C 64/393* (2017.01)
- *G05B 19/4099* (2006.01)
- *H04N 1/52* (2006.01)
- *B33Y 50/00* (2015.01)

(52) U.S. Cl.
CPC .......... *B33Y 50/02* (2014.12); *G05B 19/4099* (2013.01); *H04N 1/405* (2013.01); *H04N 1/52* (2013.01); *G05B 2219/49023* (2013.01)

(56) References Cited

U.S. PATENT DOCUMENTS

| | | | | |
|---|---|---|---|---|
| 2002/0186417 | A1* | 12/2002 | Inoue | H04N 1/4058 358/3.14 |
| 2002/0196310 | A1* | 12/2002 | Inoue | H04N 1/4058 347/43 |
| 2003/0081258 | A1* | 5/2003 | Sugizaki | H04N 1/4055 358/3.14 |
| 2005/0072113 | A1 | 4/2005 | Collins et al. | |
| 2011/0157654 | A1* | 6/2011 | Wang | H04N 1/4058 358/3.2 |
| 2011/0205583 | A1 | 8/2011 | Young et al. | |
| 2011/0222081 | A1 | 9/2011 | Yi et al. | |
| 2012/0274984 | A1* | 11/2012 | Wang | H04N 1/4055 358/3.2 |
| 2014/0163445 | A1 | 6/2014 | Pallari et al. | |

OTHER PUBLICATIONS

Pasko, Alexander, et al., "Procedure function-based modelling of volumetric microstructures", Graphical Models 73 (2011) pp. 165-181.

Chu, Chen, et al., "Design for Additive Manufacturing of Cellular Structures", Computer-Aided Design and Applications 5(5), 2008, pp. 686-696.

International Search Report and Written Opinion for international Application No. PCT/EP2015/058916 dated Sep. 22, 2015, 13 pages.

"Additive manufacturing: Solid print", The Economist, Apr. 21, 2012, 5 pages, http://www.economist.com/node/21552892.

* cited by examiner

THREE-DIMENSIONAL OBJECT SUBSTRUCTURES

BACKGROUND

Three-dimensional objects generated by an additive manufacturing process may be formed in a layer-by-layer manner. In one example of additive manufacturing, an object is generated in a print apparatus by solidifying portions of layers of build material. In examples, the build material may be in the form of a powder, fluid or sheet material. The intended solidification and/or physical properties may be achieved by printing an agent onto a layer of the build material. Energy may be applied to the layer and the build material on which an agent has been applied may coalesce and solidify upon cooling. In other examples, chemical binding agents may be used to solidify a build material. In other examples, three-dimensional objects may be generated by using extruded plastics or sprayed materials as build materials, which solidify to form an object.

Some printing processes that generate three-dimensional objects use control data generated from a model of a three-dimensional object. This control data may, for example, specify the locations at which to apply an agent to build material, or where build material itself may be placed, and the amounts to be placed.

BRIEF DESCRIPTION OF DRAWINGS

For a more complete understanding, reference is now made to the following description taken in conjunction with the accompanying drawings in which.

DETAILED DESCRIPTION

Figure 1:
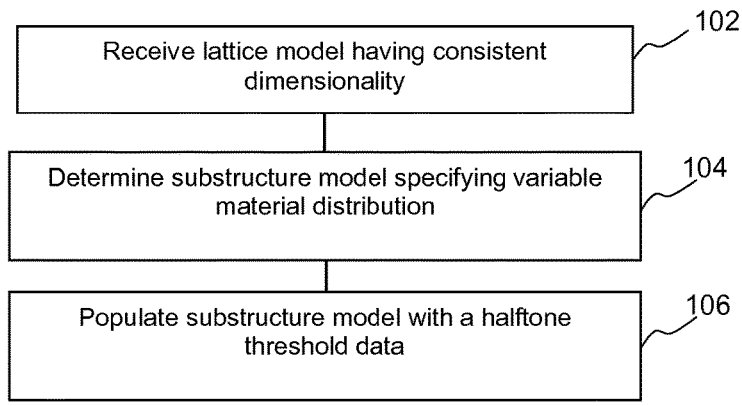
FIG. 1 is a flowchart of an example of a method in which a three-dimensional halftone threshold matrix is generated.

Some examples described herein provide an apparatus and a method for generating control data that may be used to produce a three-dimensional object. Some examples allow arbitrary three-dimensional content with a variety of specified object properties to be processed and used to generate a three-dimensional object. These object properties may comprise appearance properties (color, transparency, glossiness, etc), conductivity, density, porosity and/or mechanical properties such as strength.

In some examples herein, three-dimensional space is characterised in terms of 'voxels', i.e. three-dimensional pixels, wherein each voxel occupies a discrete volume. In data modelling a three-dimensional object, a voxel at a given location may have at least one characteristic. For example, it may be empty, or may have a particular color or may represent a particular material, or a particular object property, or the like. The voxels may have any shape, and may be of the same or of different shapes or sizes. Other volumetric descriptions may be used. In other examples, three-dimensional space may be characterised as at least one point, for example using a coordinate system such as an [x, y, z] three-dimensional Cartesian ([XYZ]) coordinate system, or a polar coordinate system. For example, object surfaces may be described in terms of tessellating flat surfaces, such as triangles, by defining the corners (which may be termed the vertices) of the triangles. Defining the corners also effectively specifies the edges and the (in one example) triangular faces. This allows an object's shape to be approximated, making economical use of computer memory space. The data may for example be the output of a Computer Aided Design (CAD) program, or some other digital representation of a three dimension object.

In some examples, data representing a three-dimensional object is processed to generate control data to be used in generating the object.

In some examples, a print material coverage representation defines print material data, for example detailing the amount of print material (such as agent(s)) to be deposited onto a layer of build material, or in some examples, build materials themselves), and, if applicable, their combinations. In some examples, this may be specified as a proportional volume coverage (for example, X % of a region of a layer of build material should have agent Y applied thereto). Such print materials may be related to or selected to provide an object property such as, for example, color, transparency, flexibility, elasticity, rigidity, surface roughness, porosity, conductivity, inter-layer strength, density, and the like.

The actual location at which each print material (for example, a drop of an agent) should be applied, as specified in control data, may be determined using halftoning techniques.

For example, a set of voxels within object model data may have an associated print material coverage representation comprising a set of material volume coverage vectors. In a simple case, such a vector may indicate that X % of a given region of three-dimensional space should have a particular agent applied thereto, whereas (100–X) % should be left clear of agent. The material print material coverage representation may then provide the input for a 'halftoning' process to generate control data that may be used by an additive manufacturing system to produce a three-dimensional object. For example, it may be determined that, to produce specified object properties, 25% of a layer of build material (or of a portion of a layer) should have an agent applied thereto. The halftoning process determines where the drops of agent fall in order to provide 25% coverage, for example by comparing each location to a threshold value provided in a halftone threshold matrix.

In some examples, data representing a three-dimensional structure or object is 'rasterized', i.e. converted to series of discrete locations. The rasterized data may be at the printable resolution of the three-dimensional print apparatus to which control data may be provided.

In some examples, control data is generated such that an object generated according to that data has a substructure. For example, the object may be intended to have an open mesh-like structure, which may make it light and/or shock resistant, and/or reduce material usage. The term 'substructure' is used to distinguish from the shape and form of an object model.

FIG. 1 is an example of a method for generating a three-dimensional halftone threshold matrix. Such a matrix could be used to generate an object having a substructure.

In block 102, a lattice model representing a three-dimensional material structure is received. This model may, for example, represent a mesh-like, or lattice-like structure. The model may represent a continuous regular structure, such as a mesh or three-dimensional lattice formed of space filling polyhedra or prisms (which may therefore form a regular structure), or irregular (for example, branch-like or vein-like) structure.

In some examples, the model may be an explicit, fully defined three-dimensional model, for example being defined as a vector object. In other examples, the model may be defined on a mathematical or algorithmic basis, for example as computer readable instructions which, when executed, can build or generate a representation of the model.

In this example, the model has consistent dimensionality, e.g. is formed of polyhedra of consistent size, or if an irregular structure comprises a consistent average spacing, or is generated based on consistent parameters, or the like.

In block 104, a substructure model which is based on the lattice model (i.e. conserves the consistent base dimensionality) is generated such that the material distribution of material used to form the substructure is intended to vary (i.e the substructure model specifies a variable material distribution).

For example, the lattice may be used to provide the medial axis (the 'skeleton') of a substructure model. However, the distribution of material in a substructure model can be varied by varying the thickness of a structural element used to form a lattice. In a particular example, a cubic lattice may comprise the same size cubic cells over its volume, but determining the substructure model comprises varying the thickness of the bar-like structural elements used to build the lattice over at least a portion of its volume. In another example, a substructure may be defined based on the dimensionality of lattice cells, but the material structure may comprise a combination of open and/or closed cells. The closed cells will therefore result in additional build material being used to form the material structure in the region thereof. In some examples, at least one closed cell may be filled. In some examples, a filled cell may be selectively filled with solidified or untreated build material (which may in some examples be a powder), which will again result in additional build material in this region of the material structure. In other examples the cells may be filled with a different material, which may for example be introduced into the cells as part of an object generation process (this may be as part of layer-by-layer generation, or by way of post processing). In some examples, a cell filling material may be specified for a cell, or for a region of an object, in the substructure model.

In block 106, the substructure model (i.e. each location in the substructure model at which the structure exists) is populated with halftone threshold data to provide a three-dimensional halftone threshold matrix. This halftone threshold matrix may be suitable for use in generating control data for manufacturing a three-dimensional object with additive manufacturing print apparatus, for example such that the object generated has the substructure specified by the substructure model.

Figure 2:
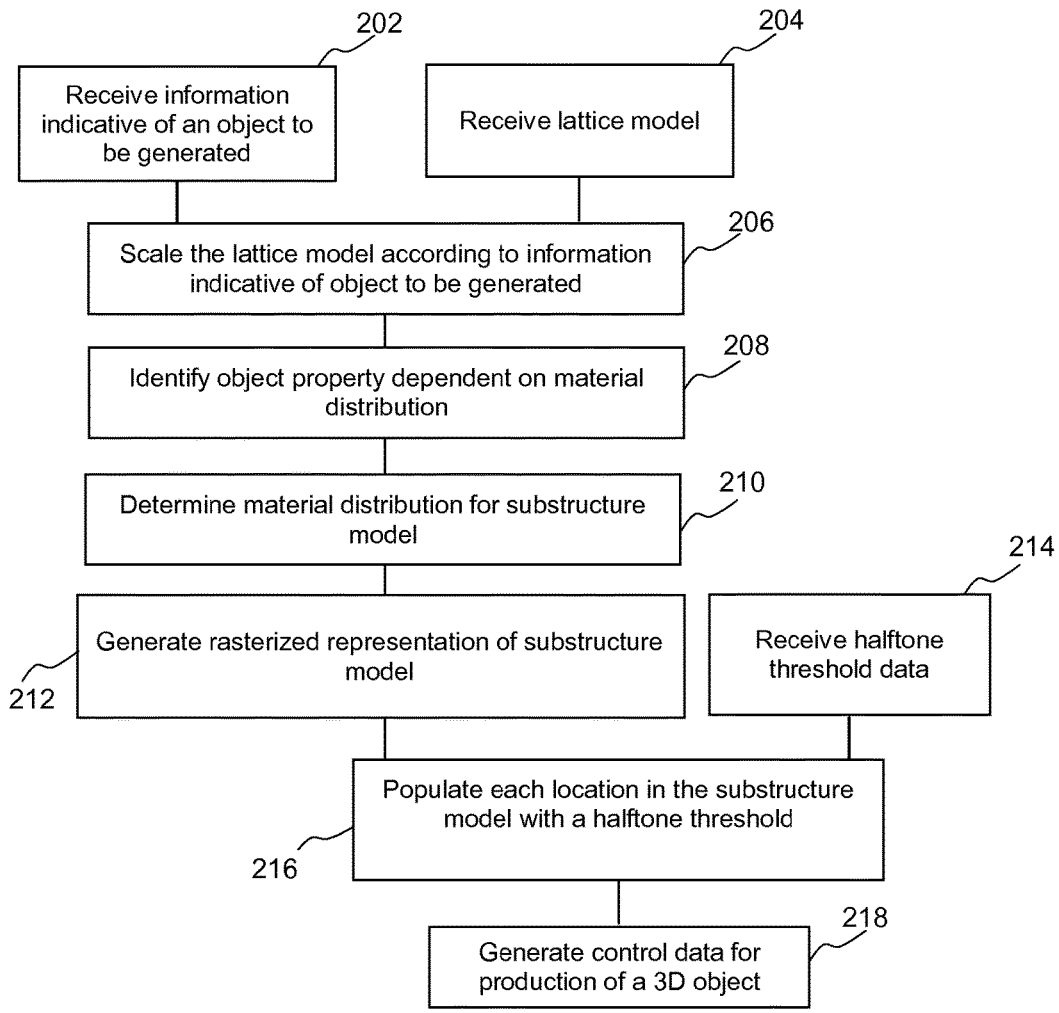
FIG. 2 is a flowchart of an example of a method in which a three-dimensional halftone threshold matrix is generated.

FIG. 2 shows a second example of a method in which a three-dimensional halftone threshold matrix is generated. In block 202, information indicative of an object to be generated is received. This information may for example comprise any of size, shape, contour, and resolution information. In block 204, a lattice model is received. In some examples, this may be as described in relation to block 102 above. In this example, the lattice model comprises an indication of the form of the lattice (for example, cubic lattice, triangular lattice, branch or vein-like lattice, etc.)

In this example, in block 206, the lattice model is scaled according to the information indicative of an object to be generated. This allows a lattice model of an appropriate size to be generated. This may also establish a base dimensionality of a substructure.

In some examples, scaling the lattice model may comprise tiling, or replicating, a base 'seed' element of the lattice. In other examples, scaling the lattice model may comprise scaling the lattice model or a base element thereof itself: for example, if the model is made up of cubic cells, the size of the cube may be set depending on the information. Scaling may comprise matching the overall size of the object to be generated (such that, for example, the object and the material structure are substantially the same size, or can be described by a voxel array of the same size). In other examples, scaling may comprise matching the size of the portion of an object to have a substructure (i.e. different lattice models could be used for different portions of a generated object). Scaling may comprise considering the size of the smallest features of the object to be generated and ensuring that such details can be represented by a material structure of appropriate scale. Scaling may also comprise a consideration of the properties specified for an object to be generated, such as the amount of material to be in a particular volume to ensure that the object has a specified strength. In other examples, the model may be freely or arbitrarily scaled by a user.

Scaling may be carried out automatically or with user input. In some examples, a particular lattice model structure (e.g. a regular cubic lattice) may be defined at a plurality of resolutions/scales (e.g. using cubes of different sizes as a base element), such that scaling the three-dimensional material structure comprises selecting one of the predefined structures.

In block 208, at least one property dependent on material distribution for the object is identified. This may be defined within the information indicative of the object to be generated, or may be defined according to user input. Such properties may comprise weight, centre of mass, density, strength, elastic behaviour and the like.

In block 210, a material distribution to be specified by a substructure model is determined in order to provide the specified property or properties. For example, material may be distributed to place the centre of mass at a specified location, or such that the object is a predetermined weight or density, or has regions of varying density, or provides a certain elasticity or resilience, or the like. This may for example comprise any, or any combination of, specifying the thickness of at least one structural elements in a region of the model, a specification of at least one partially or fully enclosed cell in a region of the substructure model, a specification that at least one cell is a filled cell, or the like.

A rasterized representation of a substructure model based on the (scaled) lattice model is then generated (block 212), for example as array of values corresponding to locations in the substructure model. In some examples, this representation may comprise a plurality of planes, each rasterized into discrete locations. If, as outlined above, the lattice model comprises a relatively large proportion of un-occupied, or empty space, each plane may be a partially, or in some examples sparsely, populated array of values. In some examples, the array is binary: the structure either exists at a location or it does not. In some examples, the array may be in the form of a plurality of binary bitmaps, each binary bitmap representing a plane of the material structure.

In block 214, halftone threshold data is received. In one example, this data may be received as a halftone threshold matrix. In one example, the threshold matrix may comprise the same dimensions as the three-dimensional substructure model itself (i.e. be a three-dimensional thresholding matrix). In other examples, the threshold data may be supplied in a different form (for example, portions of a larger threshold matrix may be used), or may be generated according to stored computer readable instructions, or the like.

In this example, the halftone data comprises an array of threshold values. In one example, the threshold values are for carrying out a halftone operation that compares a value of the threshold matrix against a value indicative of a print material (such as an agent(s) or agent combination) probability distribution, for example expressed as an Mvoc (material volume coverage) vector. This chooses a single 'state' (one of the possible materials or material combinations) based on the threshold value.

The print material coverage may vary within an object and this variation may be taken into account at the point of constructing a halftone threshold data. For example, a threshold matrix (or matrices) that natively has 'continuous tone' threshold values can be formatted to have local variability. In some examples, the print material coverage may vary between planes.

In block 216, each location where the material structure of the substructure model exists is populated with a halftone threshold. In an example in which the substructure model has been rasterized into a series of arrays, the series therefore provides (if considered as stack) a three-dimensional halftone threshold matrix which carries the structure of the substructure model: as the matrix is null in all locations other than those characterising the structure, applying the matrix will result in no use of an print material at that null location, whatever the print material coverage specified for the location. This threshold matrix may be applied to object model data to generate control data for the production of a three-dimensional object (block 218).

The halftone thresholds may be determined according to halftoning techniques such as void-and-cluster matrices, error diffusion techniques, dither based techniques, AM-screens, cluster-dot type patterns etc. In other examples, rather than supplying a three-dimensional matrix and using this to populate the substructure model, the substructure model may be directly populated with halftone data determined, for example, according to one of these techniques.

Figure 3:
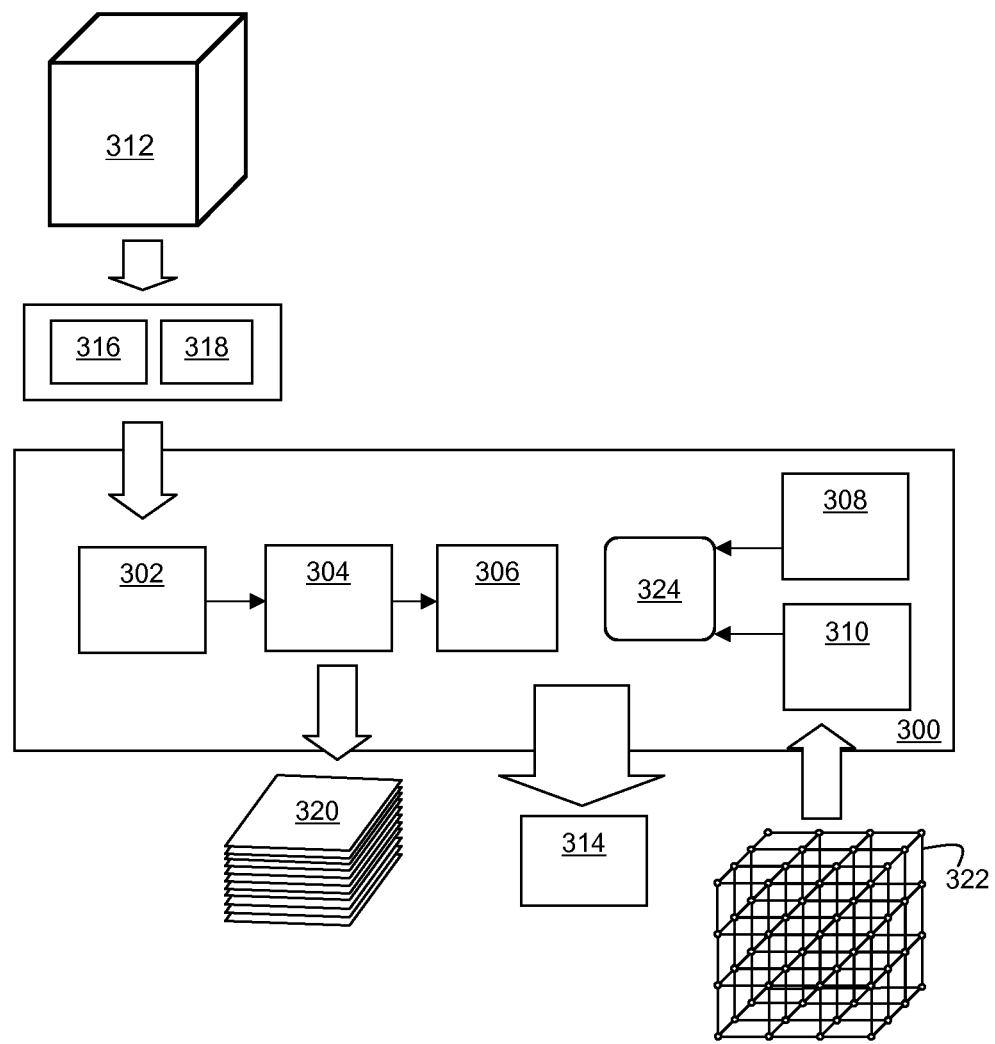
FIG. 3 is a simplified schematic of an example of processing apparatus for generating control data for production of a three-dimensional object.

FIG. 3 shows an example of processing apparatus 300 that may be used to generate control data for production of a three-dimensional object. The apparatus 300 in this example comprises an interface 302, an image processor 304, a mapping module 306, a halftone generator 308 and a substructure module 310.

In the example of FIG. 3, the data representing a three-dimensional model object 312 comprises object model data 316 and object property data 318. The object model data 316 may define a three-dimensional model of at least a portion of the model object 312. In FIG. 3, the object 312 is a simple cube although it will be appreciated that the object could have other, and more complex, forms. The model object 312 may define the shape and extent of all or part of an object in a three-dimensional co-ordinate system, e.g. the solid portions of the object. The object model data 316 may for example be generated by a computer aided design (CAD) application. Object property data 318 defines at least one object property for the three-dimensional object to be generated. In one case, the object property data 318 may comprise any, or any combination of color, flexibility, elasticity, rigidity, surface roughness, porosity, inter-layer strength, density, conductivity and the like for at least a portion of the object to be generated. Object property data 318 may be defined, for example, for the whole of an object to be generated, e.g. global property data, or for one or multiple portions of an object to be generated, e.g. local property data. The object property data 318 may also be used to define multiple object properties for a portion or portions of an object.

The processing apparatus 300 generates control data 314 which, when used to generate a three-dimensional object, will generate an object based on the input object data 316, 318 with the addition of a structure specified in the substructure module 310.

In more detail, the interface 302 receives the data 316, 318 representing the three-dimensional model object 312. In some examples, the interface 302 may receive the object model data 316 and the object property data 318 as a single file; in other examples the interface 302 may receive portions of the object model data 316 and/or the object property data 318 as multiple data objects, wherein the object model data 316 and the object property data 318 are distributed across a number of associated data structures. In one example, the object model data 316 may comprise voxels that are defined in a three-dimensional (also referred to herein as [x,y,z]) space. A given voxel may have associated data that indicates whether a portion of the model object 312 is present at that location. As described above, the object property data 318 may comprise global and local object property data, e.g. certain object property values as defined in the object property data 318 may be associated with each voxel that defines the object and/or certain object property values may be associated with a set of voxels, e.g. ranging from individual voxels to all voxels associated with the object. In one case, the data representing the three-dimensional object comprises a model of a three-dimensional object that has at least one object property specified at every location within the model, e.g. at every [x, y, z] co-ordinate.

In this example, the image processor 304 receives the object model data 316 and the object property data 318 from the interface 302. The image processor 304 processes at least the object model data 316 and generates a rasterized representation of the three-dimensional object. In an example, the image processor 304 may generate slices of parallel planes of a model of the three-dimensional object which are then rasterized. Each slice may relate to a portion of a respective layer of build material in an additive manufacturing system. In a three-dimensional space that uses a three-coordinate system, e.g. that uses [x, y, z] co-ordinates, these parallel planes may be z-slices, planes that are parallel to x and y axes (or the xy-plane). Each z-slice may comprise portion(s) of a model that have a common z co-ordinates and that extend in the x and y dimensions. The number of z-slices may depend on a resolution of detail in the z dimension and/or the output resolution of a layer of build material(s).

In this example, the image processor 304 outputs a plurality of two-dimensional raster objects 320, each representing a plane of the three-dimensional space in which the model object 312 is defined. Each of these two-dimensional raster objects may comprise an image such as a bitmap.

In this example, the image processor 304 associates at least one object property value with each location in a raster object. For example, each raster object may comprise a set of pixels that extend in the x and y dimensions; each pixel may then be associated with at least one object property value. In the case that one of the object properties defines a color, the color may be defined in a color space, such as: a monochrome contone space, e.g. grayscale; a Red, Green, Blue (RGB) color space; the International Commission on Illumination (CIE) 1931 XYZ color space, wherein three variables ('X', 'Y' and 'Z' or tristimulus values) are used to model a color; the CIE 1976 (L*, a*, b*—CIELAB or 'LAB') color space, wherein three variables represent lightness ('L') and opposing color dimensions ('a' and 'b'); or any other color space or derived color space. A color value in these color spaces may comprise a continuous tone value, e.g. a value within a predefined range of values. For example, in a simple case, an RGB color value may comprise three 8-bit values; as such each red, green and blue value may be within the range of 0 to 255. Object properties may be defined implicitly and/or explicitly and may comprise any of, amongst others: a flexibility value; an elasticity value; a rigidity value; a surface roughness value; a porosity value; a strength value; and a density value.

The mapping module 306 receives the output of the image processor 304 and maps a rasterized representation generated by the image processor 304 to a print material coverage representation of the three-dimensional object. In this example, the mapping module 306 receives raster objects 320 as described above. These may be received one by one, e.g. in an order representative of an ascending height of the object, or as a collection, e.g. all slices of the model object. In one example, the mapping module 306 maps object properties to material volume coverage (Mvoc) vectors. In some example, the mapping module 306 may receive the object model data 316 and the object property data 318 from the interface 302 directly.

An Mvoc vector may have a plurality of values, wherein each value defines a proportion for each, or each combination of print materials in an addressable location of a layer of the three-dimensional object. For example, in an additive manufacturing system with two available print materials (for example, agents)—M1 and M2, where each print material may be independently deposited in an addressable area of a layer of the three-dimensional object, there may be $2^2$ (i.e. four) proportions in a given Mvoc vector: a first proportion for M1 without M2; a second proportion for M2 without M1; a third proportion for an over-deposit (i.e. a combination) of M1 and M2, e.g. M2 deposited over M1 or vice versa; and a fourth proportion for an absence of both M1 and M2. In this case an Mvoc vector may be: [M1, M2, M1M2, Z] or with example values [0.2, 0.2, 0.5, 0.1]—i.e. in a given [x, y] location in a z slice, 20% M1 without M2, 20% M2 without M1, 50% M1 and M2 and 10% empty. As each value is a proportion and the set of values represent the available material combinations, the set of values in each vector sum to 1 or 100%.

For example, in a case where the agents are colored, then the Mvoc vector may be determined to generate select agent combinations that generate a match with a supplied object property, e.g. a supplied RGB value. The mapping to the print material coverage representation may for example be stored in a look-up table.

The halftone module 308 and the substructure module 310 operate on the print material coverage representation (for example comprising at least one Mvoc vector), either directly and independently, or having been combined such that a substructure is populated by the halftone module 308 to provide a halftone threshold matrix.

The material structure of the substructure module 310 may be based on any lattice structure, such as a regular three-dimensional lattice (e.g. a honeycomb cell-based structure based on any space-filling polyhedral such as a cube, and octahedron, or the like), a space-filling polyhedron, or forms of bio-mimicry (e.g. vein or branch-like design). Each of these lattice types may be referred to as a lattice model. In some examples, a lattice model may be defined explicitly by having an input three-dimensional model that describes its geometry in its entirety, for example in a vector domain and/or designed using a CAD program. In the example of FIG. 3, the substructure is based on a stacked cuboid mesh which provides a lattice model 322. In other examples, the structure of a lattice model may be defined implicitly or analytically, for example as being based on a regular lattice, space-filling polyhedral, or fractals, or otherwise generated according to machine readable instructions. In some examples, substructure models may be formed of tile-able elements, such that a structure (for example a cubic structure, or an octahedron structure, or a branch-like element) may be repeated in forming a substructure model. Such a tile-able elements may be used as a seed to provide a substructure for an object to be generated. In some examples, the substructure module 310 may tile a base element or seed, such as a cube or other shape.

In some examples, the substructure module 310 may change the dimensions of a base unit, or seed. This may be to ensure that features of the object, such as finer features may be represented in the object generated. The substructure module 310 may effectively replicate, or tile, data representing a number of cubes or cuboid meshes until the lattice model 322 would occupy the same volume as the model object 312. In other examples, other shapes or forms could be replicated and tiled to form a lattice model 322, or the lattice structure could be 'grown', for example from space filling polyhedra, in its entirety, for example to fill a predetermined volume, which may the same as the volume of the model object 312.

In addition, in at least a region of the substructure model, while the base dimensionality of the substructure specified by the lattice model 322 (in this examples, the lengths of the sides of a cube in the lattice model 322) remains unchanged, the material distribution within the substructure model is intended to vary. This may for example comprise any, or any combination of, specifying the thickness of at least one substructure elements in a region of the lattice, a specification of at least one partially or fully enclosed cells in a region of the substructure model, a specification that at least one cells may comprise filled cells, or the like.

Figure 4:
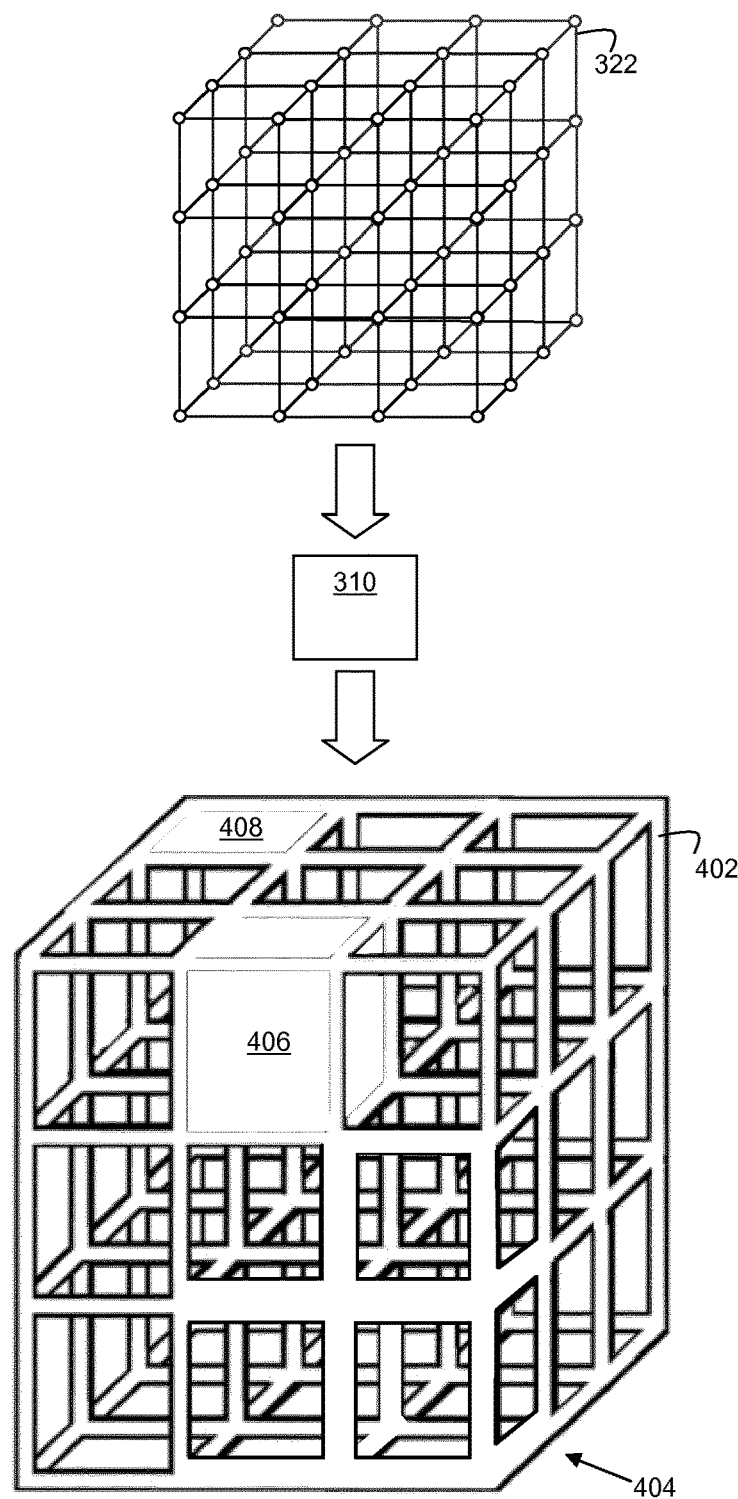
FIG. 4 is a schematic representation of an example of generation of a substructure model.

FIG. 4 shows a representation of this. The lattice model 322 is operated on by the substructure module 310 to produce a substructure model 402. The substructure model 402 has a variable material distribution.

In this example, in a region 404 of the substructure model 402, the thickness of a structural element (in this example, the bars making up the lattice) is thickened compared to other regions thereof. In other examples, part of an element may be thickened or reduced. In addition, one cell 406 of the lattice is closed, such that it comprises six solid walls. This cell 406 may also be specified to be filled, and, if so, a particular fill material may be specified. This may for example comprise untreated build material, or build material to be treated with a specified agent or agent combination. Untreated build material may be of a different density to build material and/or have an effect on local object properties such as strength and resilience. In other examples, a particular build material may be specified. A solid cell wall 408 is also specified, which does not fully enclose a cell but does result in additional material being specified in the region thereof.

Specifying a material distribution may contribute to the overall weight or an average density of an object, to the location of the object's centre of mass and/or to local properties such as strength, resilience, local density and the like.

As the lattice underlying the substructure model has consistent dimensionality, it may be specified in a constant manner, for example requiring a single identifier, or a vector description. The variable material distribution may be overlaid thereon, for example as an element width, or indicating particular locations for filled walls, closed or filled cells, cell filler material, or the like.

Furthermore, as (at least across the region of the object described in this example) the dimensionality remains consistent, the task of ensuring that portions with different material distributions are physically compatible (for example such that the underlying substructure will be continuous in nature) is relatively simple, and there may be no need for a transitional portion to be determined as may be the case if, for example, the lattice size were to change.

In some examples, the substructure module 310 may generate a rasterized representation of the substructure model 402.

The halftone module 308 provides halftone threshold data, in one example having at least one stored halftone threshold matrix.

The halftone module 308 and the substructure module 310 together generate a halftone threshold matrix 324, which is populated with instructions to selectively cause a print material to be deposited where the substructure exists and can be applied to a print material coverage representation (for example an Mvoc vector) output from the mapping module 306 to generate control data 314, for example in the form of a set of discrete print material choices for a pixel in a plane, wherein the discrete values across the area of the plane may be representative of proportions set out in the print material coverage representation.

In some examples, the substructure model 402 is rasterized before being populated. In the example of FIG. 4, some planes of the object may have a square grid like pattern, with some filled squares, while other planes may contain a sparser matrix, representing the cross-section of the upwardly extending bar-like elements of the stacked cubes.

While in the example described above, the substructure model 402 was formed by tiling a structural element, in other examples, base elements of a substructure model may instead be populated with halftone data, and then assembled to form a halftone substructure model. For example, at least one filled cells may be predefined as a set of halftone thresholds, as may a range of element thickness, filled walls, wall thickness, etc. A halftone matrix having a substructure according to the substructure model 402 could be formed by effectively stacking such predefined sets of halftone thresholds.

In a particular case, a simple model may be provided in which a single variable across a consistent lattice is the specification of a cell being open or filled. A halftone matrix may then be built up by 'stacking' cells which are fully populated with halftone data to represent filled cells, and cells which are populated in the region of the bar-like structural elements and otherwise empty.

Figure 5:
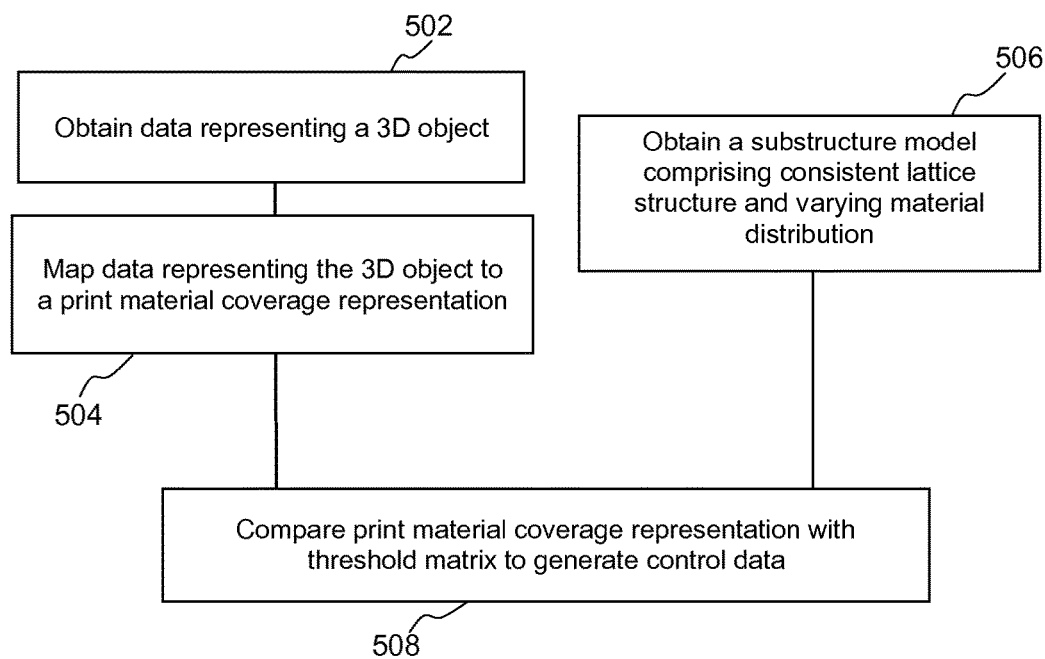
FIG. 5 is an example of a method for generating control data for production of a three-dimensional object.

An example of a method of generating control data for production of a three-dimensional object is set out in FIG. 5. In block 502, data representing a three-dimensional model object (which may be all or a portion of an object) is obtained.

In some examples the data may comprise a three-dimensional bitmap defining a M×N×L array of voxels in which M, N and L are positive integers and in which each voxel is located at a unique three-dimensional location. In some examples, the M×N×L array of voxels is a cuboid which encloses at least a portion of (and in some examples, all of) a three-dimensional model object. In block 504, the data representing the three-dimensional object is mapped to a print material coverage representation, the print material coverage representation for example specifying print material as proportions of a set of available print materials at the location. In some examples, before being so mapped, the model object may be rasterized into a plurality of planes. The number of planes used may depend on any of several factors, for example, the type of build material, type of coalescing agent, type of coalescence modifier agent(s) used, thickness per layer to provide the properties and/or finish etc.

In block 506, a substructure model representing a material structure is obtained. Such a substructure model may be based on, or grown from, a seed or base element, such as a cube or other space-filling polyhedron, following predetermined rules. There may be a number of substructure models and obtaining a substructure model may comprise selecting substructure model. The substructure may be a relatively open mesh structure. The substructure may vary over its volume. In particular, in this example, the substructure is specified by a lattice structure which is consistent over a volume (which may be all or part of a substructure), but with a varying material distribution.

The substructure model is populated with halftoning data to provide a three-dimensional halftone threshold matrix. In some examples, before being populated, the substructure model may be rasterized into planes. The number of planes may be the same as the number of slices as the model object.

The print material coverage representation is then compared with the threshold values of the threshold matrix representing the same three-dimensional location to generate control data for printing a three-dimensional object based on the model object and having a material substructure according to the substructure model (block 508).

In some examples herein, a model object is provided in order that an object may be generated. However, the generated object is intended to have a substructure which is provided not as model object data, but as a part of a halftoning operation. This allows a substructure to specified and/or applied later in design pipeline than the model object generation stage of design, and therefore a new or different substructure may be more readily applied to an object to be generated. As the material distribution within the substructure can vary, fine control over object properties can be applied with the substructure.

Examples in the present disclosure can be provided as methods, systems or machine readable instructions, such as any combination of software, hardware, firmware or the like. Such machine readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus, such the processing apparatus 300, may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices provide a means for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It should be noted that the above-mentioned examples illustrate rather than limit what is described herein, and that those skilled in the art will be able to design many alternative implementations without departing from the scope of the appended claims. In particular, a feature or block from one example may be combined with or substituted by a feature/block of another example The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   receiving a lattice model having consistent dimensionality;
   determining a substructure model representing a three-dimensional material structure, the substructure model being based on the lattice model and specifying a variable material distribution; and
   populating the substructure model with halftone threshold data to provide a three-dimensional halftone threshold matrix.

2. A method according to claim 1 in which the lattice model comprises an open cell structure, and determining the substructure model comprises specifying at least one closed cell within the substructure model.

3. A method according to claim 1 in which the lattice model comprises an open cell structure, in which determining the substructure model comprises specifying at least one closed cell within the substructure model which is filled with a material.

4. A method according to claim 3, in which determining the substructure model comprises specifying that at least one closed cell within the substructure model is filled with untreated build material.

5. A method according to claim 1 in which the lattice model is formed of structural elements, and determining the substructure model comprises specifying structural elements of varying thickness within the substructure model.

6. A method according to claim 1 in which the lattice model comprises an open cell structure, and determining the substructure model comprises specifying at least one partially enclosed cell within the substructure model.

* * * * *

UNITED STATES PATENT AND TRADEMARK OFFICE
CERTIFICATE OF CORRECTION

PATENT NO. : 10,434,716 B2
APPLICATION NO. : 15/547443
DATED : October 8, 2019
INVENTOR(S) : Peter Morovic et al.

Page 1 of 1

It is certified that error appears in the above-identified patent and that said Letters Patent is hereby corrected as shown below:

On the Title Page

In Column 1, item (72), Inventors, Line 5, delete "Sant Cugat" and insert -- Sant Cugat del Valles --, therefor.

Signed and Sealed this
Thirty-first Day of December, 2019

Andrei Iancu
*Director of the United States Patent and Trademark Office*